(12) United States Patent
Holland

(10) Patent No.: US 8,003,707 B2
(45) Date of Patent: Aug. 23, 2011

US008003707B2

(54) METAL-RICH SILICEOUS COMPOSITIONS AND METHODS OF PRODUCING SAME

(75) Inventor: Brian T. Holland, Oak Park, IL (US)

(73) Assignee: Nalco Company, Naperville, IL (US)

( * ) Notice: Subject to any disclaimer, the term of this patent is extended or adjusted under 35 U.S.C. 154(b) by 0 days.

(21) Appl. No.: 12/628,472

(22) Filed: Dec. 1, 2009

(65) Prior Publication Data

US 2010/0074974 A1 Mar. 25, 2010

Related U.S. Application Data

(63) Continuation of application No. 11/557,548, filed on Nov. 8, 2006, now abandoned.

(51) Int. Cl.
*B01F 3/12* (2006.01)
(52) U.S. Cl. ............... 516/78; 106/286.1; 106/286.7; 162/181.6; 252/79; 424/724; 426/423; 438/692; 502/243; 502/262; 502/439; 507/269; 530/412
(58) Field of Classification Search ............... 106/286.1, 106/286.7; 162/181.6; 252/79.1; 424/724; 426/423; 438/692; 502/243, 262, 439; 507/269; 530/412; 516/78
See application file for complete search history.

(56) References Cited

U.S. PATENT DOCUMENTS

| | | | |
|---|---|---|---|
| 2,892,797 | A | 6/1959 | Alexander et al. |
| 3,575,888 | A | 4/1971 | Long |
| 3,745,126 | A | 7/1973 | Moore |
| 3,864,142 | A | 2/1975 | Kovarik |
| 3,954,496 | A | 5/1976 | Batzar |
| 4,451,388 | A | 5/1984 | Payne |
| 5,015,453 | A | 5/1991 | Chapman |
| 6,040,472 | A * | 3/2000 | Yamamatsu et al. .......... 560/210 |
| 6,051,672 | A | 4/2000 | Burns et al. |
| 6,358,882 | B1 | 3/2002 | Salem et al. |
| 2005/0014000 | A1 | 1/2005 | Bringley et al. |
| 2005/0234136 | A1 * | 10/2005 | Holland et al. .................. 516/80 |

FOREIGN PATENT DOCUMENTS

WO WO 03/054096 A1 7/2003

OTHER PUBLICATIONS

Arnal, Pablo M. et al., "Highly Monodisperse Zirconia-Coated Silica Spheres and Zirconia/Silica Hollow Spheres with Remarkable Textural Properties," *Chemistry of Materials*, vol. 18, No. 11, 2006, pp. 2733-2739.
Breitscheidel, B. et al., "Metal Complexes in Inorganic Matrices.

Nanometer-Sized, Uniform Metal Particles in a $SiO_2$ Matrix by Sol-Gel Processing of Metal Complexes," *Chemistry of Materials*, vol. 3, No. 3, 1991, pp. 559-566.
Crudden, C.M. et al., "Mercaptopropyl-Modified Mesoporous Silica: A Remarkable Support for the Preparation of a Reusable, Heterogeneous Palladium Catalyst for Coupling Reactions," *Journal of American Chemical Society*, vol. 127, 2005, pp. 10045-10050.
Gommes, C. J. et al., "Assessment of the 3D Localization of Metallic Nanoparticles in $Pd/SiO_2$ Cogelled Catalysts by Electron Tomography," *Langmuir*, vol. 21, 2005, pp. 12378-12385.
Grasset, F. et al., "Synthesis of $CeO_2@SiO_2$ Core-Shell Nanoparticles by Water-in-Oil Microemulsion. Preparation of Functional Thin Film," *Journal of Colloid and Interface Science*, vol. 299, 2006, pp. 726-732.
Han, Y. et al., "Hydrothermally Stable Ordered Hexagonal Mesoporous Aluminosilicates Assembled from a Triblock Copolymer and Preformed Aluminosilicate Precursors in Strongly Acidic Media," *Chemistry of Materials*, vol. 14, No. 3, 2002, pp. 1144-1148.
Heinrichs, B. et al., "Palladium-Silver Sol-Gel Catalysts for Selective Hydrodechlorination of 1,2-Dichloroethane into Ethylene," *Journal of Catalysis*, vol. 172, 1997, pp. 322-335.
Heinrichs, B. et al., "$Pd/SiO_2$ Cogelled Aerogel Catalysts and Impregnated Aerogel and Xerogel Catalysts: Synthesis and Characterization," *Journal of Catalysis*, vol. 170, 1997, pp. 366-376.
Heinrichs, B. et al., "A TEM Study on Localization of Metal Particles in Cogelled Aerogel Catalysts," *Journal of Catalysis*, vol. 241, 2006, pp. 229-231.
Hermans, L. A. M.& Geus, J. W., "Interaction of Nickel Ions With Silica Supports During Deposition-Precipitation," *Studies in Surface Science and Catalysis*, vol. 3, 1979, pp. 113-130.

(Continued)

*Primary Examiner* — Ling-Siu Choi
*Assistant Examiner* — Chun-Cheng Wang
(74) *Attorney, Agent, or Firm* — Edward O. Yonter; Michael B. Martin

(57) ABSTRACT

A modified sol-gel method to create metal-rich siliceous material, such as colloidal silica or aluminosilicate particles is disclosed. Initially, the metal salt of choice is added to a silicic acid solution or a silicic acid solution containing aluminum salt. The aluminum is added to vary the metal-support interaction as it forms Al—O—Si linkages within the silica matrix. Besides aluminum, other metals can be added that form M—O—Si (M=Ti, B, etc.) linkages, which do not become reduced when treated with a reducing agent. Once the metal, silicic acid and/or aluminum salt is generated, it is subjected to colloidal growth by addition to a basic heel. Upon colloidal synthesis, the metal salt containing colloidal particle is left as is to maximize colloidal stability or is reduced with hydrazine to produce the zero valence metal-containing colloidal particle. Keeping a particle colloidal before use may be an effective method of forming a catalyst material as it can be easily spray-dried or mixed with other materials for extruded catalyst particles.

15 Claims, 4 Drawing Sheets

OTHER PUBLICATIONS

Iler, R. K., "The Effect of Surface Aluminosilicate Ions on the Properties of Colloidal Silica," *Journal of Colloid and Interface Science*, vol. 55, No. 1, Apr. 1976, pp. 25-34.

Iler, R. K., *The Chemistry of Silica*, John Wiley & Sons, New York, NY, 1979, pp. 710-712.

Iwasawa, Y. & Ogasawara, S., "Spectroscopic Study on the Surface Structure And Environment Of Fixed Mo Catalysts Prepared by Use of Mo($\pi$-C$_2$H$_5$)$_4$," *Journal of Chemical Society, Faraday Translation I*, 1979, vol. 75, 1465-1476.

Kaszkur, Z., "Powder Diffraction Beyond the Bragg Law: Study Of Palladium Nanocrystals," *Jounal of Applied Crystallography*, vol. 33, 2000, pp. 1262-1270.

Lambert, S. et al., "Study of Textural Properties and Nucleation Phenomenon in Pd/SiO$_2$, Ag/SiO$_2$ and Cu/SiO$_2$ Cogelled Xerogel Catalysts," *Journal of Non-Crystalline Solids* vol. 342, 2004, pp. 70-81.

Lambert, S. et al., "Pd- Ag/SiO$_2$ and Pd-Cu/SiO$_2$ Cogelled Xerogel Catalysts for Selected Hydrodechlorination of 1,2-dichloroethane into Ethylene," *Catalysis Today*, vol. 100, 2005, pp. 283-289.

Lambert, S. et al., "Improvement of Metal Dispersion in Pd/SiO$_2$ Cogelled Xerogel Catalysts for 1,2-dichloroethane Hydrodechlorination," *Applied Catalysis B: Environmental*, vol. 50, 2004, pp. 127-140.

Lambert, S et al., "Synthesis of Pd/SiO$_2$, Ag/SiO$_2$, and Cu/SiO$_2$ Cogelled Xerogel Catalysts: Study of Metal Dispersion and Catalytic Activity," *Journal of Catalysis*, vol. 221, 2004, pp. 335-346.

Lambert, S et al., "Synthesis of SiO$_2$ Xerogels and Pd/SiO$_2$ Cogelled Xerogel Catalysts from Silylated Acetylacetaonate Ligand," *Journal of Non-Crystalline Solids*, vol. 343, 2004, pp. 109-120.

Lopez, T. et al., "Pt/SiO$_2$ Sol-Gel Catalysts: Effects of pH and Platinum Precursor," *Journal of Physical Chemistry*, vol. 97, 1993, pp. 1671-1677.

Lu, Z. et al., "Effects of the Concentration of Tetramethylammonium Hydroxide Peptizer on the Synthesis of Fe$_3$O$_4$/SiO$_2$ Core/Shell Nanoparticles," *Colloids and Surfaces*, vol. 278, 2006, pp. 140-143.

Mahfouz, R. M. et al., "Isothermal Decomposition of $\gamma$-Irradiated Palladium Acetate," *Radiation Effects & Defects in Solids.*, vol. 159, Jun. 2004, pp. 345 -351.

Mizukoshi, Y. et al., ."Sonochemical Preparation of Bimetallic Nanoparticles of Gold/Palladium in Aqueous Solution," *Journal of Physical Chemistry B*, vol. 101, No. 36, Sep. 4, 1997, pp. 7033-7097.

Mokaya, R. "Al Content Dependent Hydrothermal Stability of Directly Synthesized Aluminosilicate MCM-41," *Journal of Physical Chemistry B*, vol. 104, No. 34, 2000, pp. 8279-8286.

Morke, W. et al., "Metal Complexes in Inorganic Matrices. Composition of Highly Dispersed Bimetallic Ni, Pd Alloy Particles Prepared by Sol-Gel Processing: Electron Microscopy and Ferromagnetic Resonance Study," *Chemistry of Materials*, vol. 6, 1994, pp. 1659-1666.

Sa, J. et al. "Factors Influencing Hydride Formation in a Pd/TiO$_2$ Catalyst," *Journal of Physical Chemistry B*, vol. 110, No. 34, 2006, pp. 17090-17095.

Sacco, L et al., "Olefin Cyclopropanation and Insertion into O-H Bonds Mediated by Copper(I) and Palladium(II) Covalently Anchored to Silica Xerogels," *Journal of Catalysis*, vol. 232, 2005, pp. 51-59.

Tanaka, S. et al., "Preparation of Highly Dispersed Silica-Supported Palladium Catalysts by a Complexing Agent- Assisted Sol-Gel Method and Their Characteristics," *Applied Catalysis A*: General, vol. 229, 2002, pp. 165-174.

Ueno, A. et al, "Particle-size Distribution of Nickel Dispersed on Silica and its Effects on Hydrogenation of Propionaldehyde," *Journal of Chemical Society, Faraday Translation I*, vol. 79, 1983, pp. 127-136.

* cited by examiner

PXRD pattern of the 5.28 wt% Pd(0) before reduction.

PXRD pattern of 5.28 wt% Pd(0) after reduction.

PXRD pattern of the (111) peak for the 0.55 (— —), 1.10 (- - -), and 1.82 (——) wt% Pd(0) colloidal aluminosilicate particles after reduction.

Powder x-ray diffraction pattern, not reduced (- - -) and reduced (—), of the 1.07 wt% Au(0) and Pd(0) colloidal aluminosilicate particles with a mole ratio of Pd(0)/Au(0)=4.

METAL-RICH SILICEOUS COMPOSITIONS AND METHODS OF PRODUCING SAME

CROSS-REFERENCE TO RELATED APPLICATION

This is a continuation application of U.S. patent application Ser. No. 11/557,548, entitled "Metal-Rich Siliceous Compositions and Methods of Producing Same," filed on Nov. 8, 2006 now abandoned, which is incorporated herein by reference in its entirety

TECHNICAL FIELD

This invention relates generally to siliceous materials having incorporated metal particles and processes to produce such materials. More specifically, the invention relates to a process of adding a metal salt to a silicic acid solution to create a metal-rich siliceous material. The invention has particular relevance to preparing colloidal silica having reduced incorporated metal particles

BACKGROUND

The preparation and use of colloidal materials, such as colloidal silica, are generally knownused. Typically, the silica colloid is first synthesized. The colloid is then coated with a metal oxide. This coating procedure produces both negatively and positively charged surfaces, depending upon the properties of the metallic starting material and the coating method used. Metal-containing silica colloids are useful in various areas, such as chemical mechanical polishing agents in the electronics industry, coating applications, and as support materials in catalytic processes. Despite this versatility, conventional-type silica colloids have several disadvantages.

Liquid suspended metal nanoparticles have several drawbacks in catalysis including difficulties in recycling the nanoparticle catalyst. Immobilization of the catalyst on a solid support makes it possible to recycle the catalyst via simple filtration. Synthesis of the immobilized catalyst (which involves infusing the solid support with metal nanoparticles), however, can be highly time consuming. For example, palladium-catalyzed reaction for carbon-carbon bond formation (Heck Reaction) is a versatile industrial synthesis tool. It includes impregnating a solid support, such as precipitated silica, with Palladium (II) acetate, drying, and reducing with hydrogen gas or other suitable reducing agent.

Two well-known methods of incorporating metals onto porous supports are impregnation (sometimes referred to as the "incipient wetness" technique) and direct synthesis via the sol-gel technique. Impregnation involves taking a solid porous support and adding metal salt solutions to the support. The metal salt solutions intercalate through the structure of the porous support and form surface deposits upon drying. During reduction of the deposited metal salts, the metal particles have a tendency to migrate over the surface of the porous support and must make their way through the porous structure to disperse. This migration leads to sintering and an overall decrease in catalytic activity due to smaller active surface areas (See Hermans & Geus, Interaction of Nickel Ions With Silica Supports During Deposition-Precipitation, *Stud. Surf. Sci. Catal.*, 1979, pp. 113 to 130).

The sol-gel technique (See Lopez et al., Pt/$SiO_2$ Sol-Gel Catalysts: Effects of pH and Platinum Precursor, *J. Phys. Chem.*, 1993, pp. 1671 to 1677) involves mixing metal salts with a silane precursor, such as tetraethyl orthosilicate ("TEOS"). Over time, the TEOS hydrolyzes and its SiOH groups interact with the metal salts. Once the SiOH groups begin to condense and form a precipitate, the metals are dispersed within the $SiO_2$ matrix via terminating $SiO^-$ or SiOH groups. The metal salts in the sol-gel technique tend to become occluded within the structure during synthesis.

A need therefore exists for improved methods of incorporating metals into siliceous colloidal compositions. In particular, synthesis methods for creating silica-based colloids or particles having more homogenously dispersed metal loads and enhanced stability over a greater pH range and/or other suitable characteristics are desirable. Furthermore, it is desirable to form such colloids with a narrow particle size distribution.

SUMMARY

Accordingly, this invention provides a method of preparing a metal-rich siliceous material. The method includes mixing one or more salts of one or more metals with a silicic acid solution to form a blend. The blend is added to a basic heel solution for form colloidal silica particles in a suspension. One or more of the colloidal silica particles includes incorporated metal particles. In some embodiments, the method includes concentrating the suspension, reducing the incorporated metal particles with a reducing agent, and/or further processing steps.

The invention also provides a metal-rich siliceous composition comprising a plurality of settled silica particles. The particles are produced from a mixture of a silicic acid solution and one or more salts of one or more metals. From about 10 weight percent to about 50 weight percent metal is associated with the colloidal silica particles, based on total solids.

In an aspect, the invention includes a metal-rich siliceous composition comprising a plurality of colloidal silica particles having an average diameter from about 1 to about 250 nanometers. The particles are produced from a mixture of a silicic acid solution and one or more salts of one or more metals. Up to about 10 weight percent metal is associated with the colloidal silica particles, based on total solids.

It is an advantage of the invention to provide method of directly incorporating metals into colloidal materials.

A further advantage of the invention is to provide a method of forming metal-rich colloidal silica particles having essentially homogenously distributed or dispersed metal particles and a narrow particle size distribution.

It is another advantage of the invention is to provide a cost-effective and efficient method of formulating colloidal materials with metal constituents and reducing the associated metals in the liquid state with reducing agents, such as hydrazine, after the catalyst is generated.

It is a further advantage of the invention to provide a cost-effective and efficient method of formulating colloidal materials with metal constituents and reducing the associated metals in the dried state with reducing agents, such as hydrogen gas, after the catalyst is generated.

DETAILED DESCRIPTION

Figure 1:
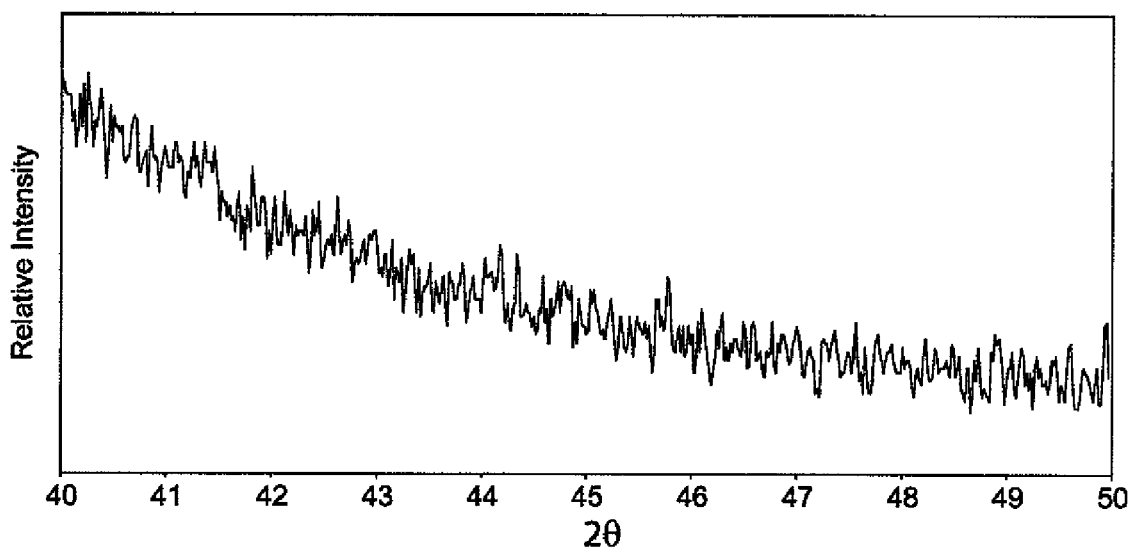
FIG. 1 depicts the PXRD pattern of the 5.28 weight percent Pd(0) before reduction.

A modified sol-gel method to create metal-rich siliceous material, such as colloidal silica or aluminosilicate is disclosed. In an embodiment, the metal salt of choice is added to a silicic acid solution or a silicic acid solution containing aluminum salt. The aluminum is added to vary the metal-support interaction as it forms Al—O—Si linkages within the silica matrix. Besides aluminum, other metals can be added that form M-O—Si (M=Ti, B, etc.) linkages, which do not become reduced when treated with a reducing agent, as described below. Once the metal, silicic acid and/or aluminum salt is mixed, it is subjected to colloidal growth by addition to a basic heel. The metal salt containing colloidal particle is left as is to maximize colloidal stability or is reduced with hydrazine to produce the zero valence metal-containing colloidal particle. Keeping a particle colloidal before use may be an effective method of forming a catalyst material as it can be easily spray-dried or mixed with other materials for extruded catalyst particles.

The invention provides a process to incorporate metal particles into siliceous materials, such as colloidal silica or metallosilicates. The metal particles may include a variety of metals, such as alkaline metals, alkaline earth metals, first row transition metals, second row transition metals, lanthanides, the like, and combinations thereof. In a preferred embodiment, the metals include palladium, platinum, iron, gold, aluminum, copper, nickel, iron, titanium, and combinations thereof. In a more preferred embodiment, the metals include palladium, gold, aluminum, and combinations thereof.

The process involves adding a salt of a metal, such as palladium acetate, to silicic acid to produce a mixture. Introducing this mixture to a basic heel solution (described below) leads to formation of colloidal silica particles. The palladium-containing colloidal silica particles are then reduced, in an embodiment, with a reducing agent (e.g., hydrazine or hydrogen gas) to form palladium particles with a zero valence. It is contemplated that in addition, metal oxides (e.g., alumina, titania, and the like) may be added to the silicic acid to produce metallosilicates that offer different metal-support interactions with the reduced metal.

It should be appreciated that one or more of several metal salts may be used in the process of the invention. For example, mixed metals, such as gold and palladium, may be used. In this example, gold chloride and palladium acetate may be added to the silicic acid to form the metal-rich colloidal silica. Other representative metal salts that may used include, copper chloride, iron trinitrate, nickel nitrate, cobalt chloride, the like, and combinations thereof.

The colloidal compositions of the invention are stable to gelling or precipitation and typically remain in the colloidal state with concentrations from about 0.1 weight percent to about 40 weight percent total solids. Upon reduction of the metal salts to metal, the material remains stable at low concentrations of metal added, for example, up to about 2 weight percent reduced metal, based on solids. In one embodiment, some settling occurs at concentrations more than about 2 weight percent reduced metal, based on solids. In another embodiment, minimal settling occurs at concentrations up to about 40 weight percent reduced metal, based on solids.

In an embodiment, upon forming the metal-rich siliceous particles, they are subjected to a reducing agent to reduce the associated metal particles from salt form to zero valence form. The reducing agent is typically hydrazine if the metal is reduced while the particles are in solution and hydrogen gas if the material is dried (e.g., flash drying, spray drying, and the like) prior to reducing.

In an embodiment, the method includes preparing a silicic acid solution. It is contemplated that the silicic acid may be prepared using any suitable method. A representative method includes deionizing a sodium silicate, such as sodium orthosilicate ($Na_4SiO_4$), sodium metasilicate ($Na_2SiO_3$), sodium polysilicate ($Na_2SiO_3)_n$, sodium pyrosilicate $Na_6Si_2O_7$, the like, and/or any combination thereof with an ion exchange resin. Preferably, the sodium silicate is deionized with a strong acid ion exchange resin to produce the silicic acid or acid sol. An alternative method includes using the well-known Stöber process to produce the silicic acid.

The basic heel solution used to synthesize the metal-rich siliceous material of the method acts as a catalyst for forming the material. In alternative embodiments, the heel solution may be heated from about 60° C. to about 90° C. prior to adding the silicic acid/metal salts blend. The basic heel solution typically is in the range from about 10 milliequivalents ("meq") to about 200 meq and may alternatively include various types of bases. Representative bases include sodium hydroxide, lithium hydroxide, potassium hydroxide, ammonium hydroxide, primary amines, secondary amines, tertiary amines, quaternary amines, quaternary compounds, the like, and combinations thereof. Representative quaternary compounds include tetraethyl ammonium hydroxide, tetra-n-butyl ammonium hydroxide, tetra-n-propyl ammonium hydroxide, tetramethyl ammonium hydroxide, NNN-trimethyl-2-butyl ammonium hydroxide, NNN-trimethyl-propyl ammonium hydroxide, the like, and combinations thereof.

It is well known to those skilled in the art that controlling the rate at which the silicic acid/metal salt blend is added to the basic heel solution allows determining the particle size distribution. In a preferred embodiment, the colloidal particles have an average diameter from about 1 nanometer to about 250 nanometers. In a more preferred embodiment, the particles have an average diameter from about 4 nanometers to about to about 150 nanometers.

It is contemplated that the metal-rich siliceous material of the invention may be used in a variety of industrial applications. Representative applications include dental applications, protein separation, molecular sieves, nanoporous membranes, wave guides, photonic crystals, refractory applications, clarification of wine and juice, chemical mechanical planarization of semiconductor and disk drive components, catalysts, catalyst supports, retention and drainage aids in papermaking, fillers, surface coatings, ceramic materials, investment casting binders, flattening agents, proppants, cosmetic formulations, and polishing abrasives. Certain of these industrial applications may require that the material of the invention be further processed prior to using it in the application. Possible processing steps include ultra-filtration, deionization, heating, drying, concentrating, surface functionalization, the like, and combinations thereof.

EXAMPLES

The foregoing may be better understood by, reference to the following examples, which are intended for illustrative purposes and are not intended to limit the scope of the invention.

The silica source for the below examples was silicic acid (or acid sol). The silicic acid was produced by passing a solution containing 25 grams of sodium silicate (R-570) in 57.37 grams deionized water through a cationic exchange resin. Though any suitable column or resin may be used, in these examples, a column containing about 40 ml Dowex™ 650C strong cationic exchange resin (available from Dow Chemical Company in Midland, Mich.) per 100 grams of diluted sodium silicate solution was used.

Example I

Palladium acetate, as indicated in Table I, was dissolved in HCl (at full concentration with no added water). In some samples, aluminum chlorohydrate was added to the silicic acid under stirring after which the palladium acetate/HCl mixture was added. The silicic acid/aluminum chlorohydrate/palladium acetate/HCl solution is stable to gelation or precipitation.

A sodium hydroxide heel was heated to about 80° C. in a four-neck, round-bottomed flask. For the 0.55, 1.10, and 1.82 weight percent (based on total solids) palladium metal silica colloids, the silicic acid/aluminum chlorohydrate/palladium acetate/HCl solution was dripped into the flask under stirring at a rate of about 10 ml/min for each reaction in Table I. For the 5.28 weight percent palladium sample, the only preparation difference was the lack of aluminum chlorohydrate. A mixed metal silica colloid catalyst was also generated at a 1.07 weight percent total metal content with a palladium to gold molar ratio of 4. This mixed metal catalyst was then concentrated by ultrafiltration to 16.3% total solids.

TABLE I

| Raw Materials | 0.55 wt % Pd (0) | 1.10 wt % Pd (0) | 1.82 wt % Pd (0) | 5.28 wt % Pd (0) | 1.07 wt % Mole Ratio Pd (0)/Au (0) = 4 |
|---|---|---|---|---|---|
| Silicic Acid | 30.00 | 30.00 | 30.00 | 30.00 | 30.000 |
| HCl | 0.10 | 0.15 | 0.25 | 0.60 | 0.150 |
| Palladium Acetate | 0.03 | 0.06 | 0.10 | 0.30 | 0.040 |
| Gold Chloride | N/A | N/A | N/A | N/A | 0.0135 |
| Aluminum Chlorohydrate | 0.06 | 0.12 | 0.20 | 0.00 | 0.110 |
| NaOH | 0.33 | 0.30 | 0.40 | 0.80 | 0.300 |
| Deionized water | 69.48 | 69.37 | 69.05 | 68.30 | 69.3865 |
| Total wt % | 100.00 | 100.00 | 100.00 | 100.00 | 100.000 |

Depending on the concentration of the palladium acetate/HCl solution, the color after addition to the silicic acid or silicic acid/aluminum chlorohydrate solution was light yellowish brown for the 0.55 wt % Pd(0) sample to dark brown for the 5.28 wt % Pd(0) sample. The solutions were very stable to gelling or precipitation and could be stored for hours before use to make the colloidal particles. The caustic heel was heated to 80° C. and the silicic acid/palladium acetate or silicic acid/aluminum chlorohydrate/palladium acetate solution was dripped in at 10 ml/min to create for an intended silica colloid particle size of about 10 nanometers.

Example II

The samples from Example I were subsequently characterized as is or upon reduction with 1 ml of 10 wt % hydrazine solution in deionized water. Characterization of the metal-rich silica colloids included transmission electron microscopy ("TEM"), powder X-ray diffraction ("PXRD"), and nitrogen sorption. A Philips (FBI) EM208S TEM (100 kV) equipped with a thermionic tungsten filament or a JEOL 3010 TEM (300 kV) equipped with a $LaB_6$ filament were used. PXRD on the calcined samples was performed with a Philips PANalytical® X'Pert Pro 3040 using Co Kα radiation with a wavelength of 1.78897 Å. Samples were washed with adequate amounts of deionized water to remove any NaCl that was present. Nitrogen sorption measurements were performed with an Autosorb-1C from Quantachrome®. Each sample was degassed for 3 hours at 300° C.

The 0.55, 1.10, and 1.82 wt % Pd(0) samples were used as is (i.e., no further concentration by ultrafiltration), while the 5.28 wt % Pd(0) sample was concentrated to 14% solids and the 1.07 wt % Pd(0) and the Au(0) sample was concentrated to 16.3% solids prior to reduction with hydrazine. The powder x-ray diffraction ("PXRD") pattern for the 5.28 wt % Pd(0) before reduction is shown in FIG. 1. The sample was air dried in a vent hood prior to PXRD pattern acquisition. The PXRD pattern is void of any distinguishable peaks including the 100% intensity (111) peak, which should be at 2θ=46.943 for Pd(0). It appears that no reduction has taken place after drying at room temperature under ambient conditions. In addition, there is no Pd(0) phase or palladium acetate phase that is present.

Figure 2:
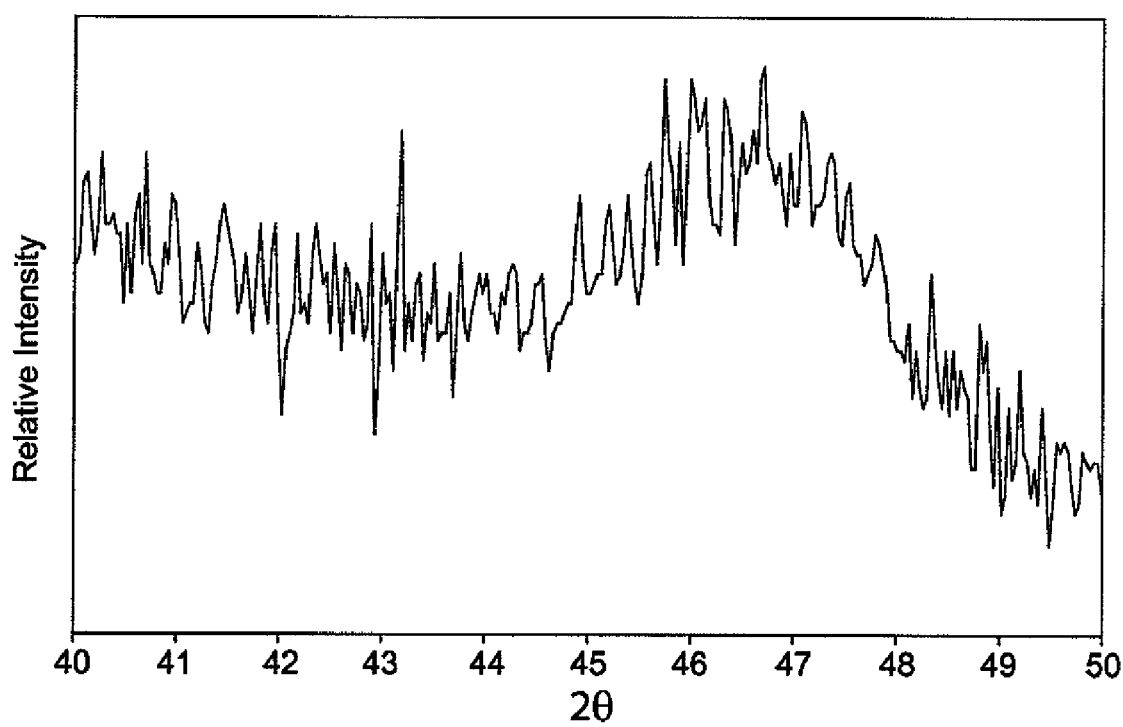
FIG. 2 illustrates the PXRD pattern of 5.28 weight percent Pd(0) after reduction.

FIG. 2 depicts the PXRD pattern of the 5.28 wt % Pd(0) sample after reduction with hydrazine. The broad Pd(0) (111) peak at 2θ=46.71 can be seen. Table II shows the average Pd(0) particle size, as calculated using the Scherer equation $(t=0.9\lambda/(B \cos \theta))$ for certain samples from Table I.

TABLE II

| Sample | Particle Size by PXRD (nm) | Particle Size by TEM (nm) |
|---|---|---|
| 0.55 wt % Pd(0) | 4.24 | 4.19 |
| 1.10 wt % Pd(0) | 4.60 | N/A |
| 1.82 wt % Pd(0) | 2.87 | 2.99 |
| 5.28 wt % Pd(0) | 2.37 | N/A |

Since no other palladium phase is present besides Pd(0) in FIG. 2, 100% reduction of the palladium is assumed. The 5.28 wt % Pd(0) sample is the only sample that did not use $Al_2O_3$ in the silica matrix. Adding various metal oxides to the silica support can vary the support-metal interaction. It appears that the metal-support interaction may not play as vital of a role in the direct synthesis technique of the invention since a very small Pd(0) particle is obtained. It also appears that the concentration of the palladium salt plays a more critical role in determining particle size.

Figure 3:
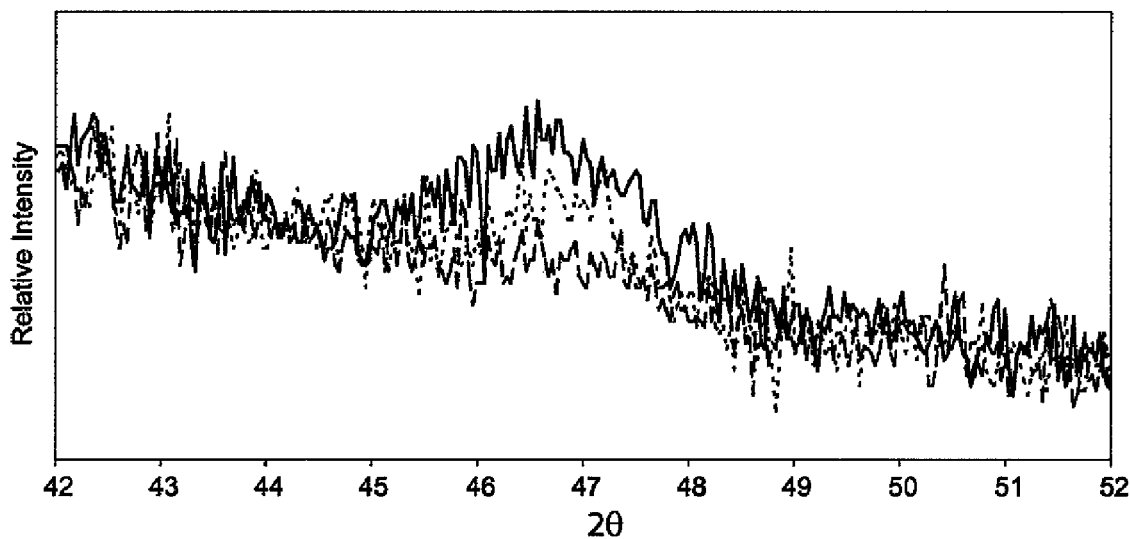
FIG. 3 shows the PXRD pattern of the (111) peak for the 0.55 (- -), 1.10 (- - -), and 1.82 (-) weight percent Pd(0) colloidal aluminosilicate particles after reduction.

Referring to FIG. 3, the PXRD patterns after reduction of the 0.55 (- -), 1.10 (- - -), and 1.82 (-) wt % Pd(0) materials are depicted. The PXRD patterns show the (111) peak associated with Pd(0). As with the 5.28 wt % Pd(0) sample, the peak is extremely broad for all three samples, with the average particle size as determined by the Scherer equation as shown in Table II. The lower 0.55 and 1.10 wt % Pd(0) samples have a larger average particle size of Pd(0), 4.24 and 4.60 nm, respectively, than the higher 1.82 wt % Pd(0) sample, which has an average particle size for Pd(0) of 2.87 nm. The 5.28 wt % Pd(0) sample has an even smaller particle size than the lower Pd(0) wt % samples, which is not typically observed by PXRD in the doping of metal particulates via previously known sol-gel synthesis techniques.

Figure 4:
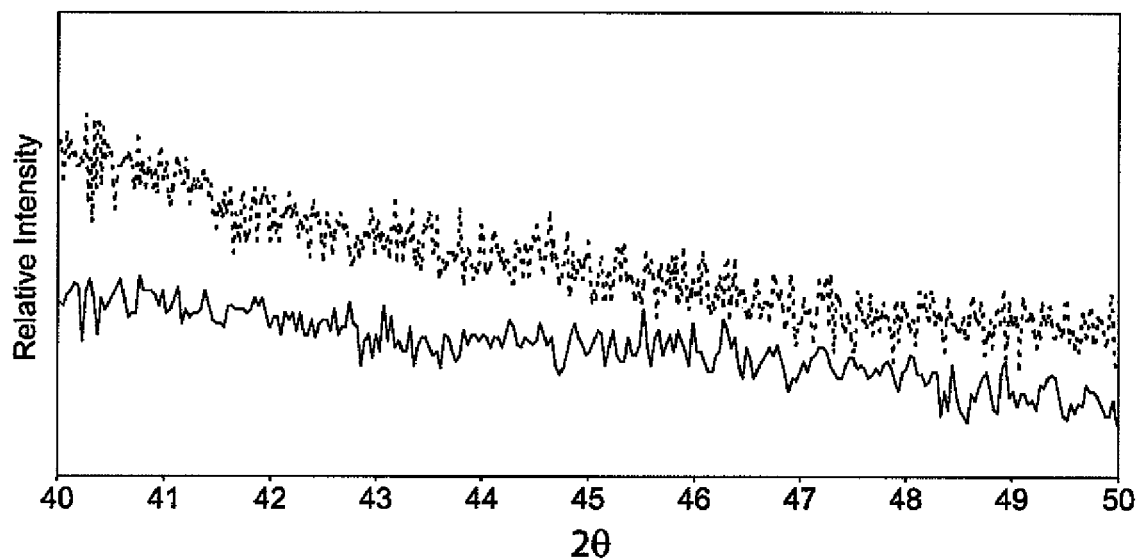
FIG. 4 is the PXRD pattern, not reduced (- - -) and reduced (-), of the 1.07 weight percent Au(0) and Pd(0) colloidal aluminosilicate particles with a mole ratio of Pd(0)/Au(0)=4.

FIG. 4 is the PXRD pattern (not reduced (- - -) and reduced (-)) of the 1.07 wt % Au(0) and Pd(0) colloidal aluminosilicate particles with a mole ratio of Pd(0)/Au(0)=4. The PXRD of the 1.10 wt % Pd(0) shown in FIG. 3 gives a very distinct peak for the Pd(0) (111), whereas the 1.07 wt % (111) peak for both Au(0) and Pd(0) in FIG. 4 are not seen. The extremely broad PXRD peak is an indication of the good dispersion of the Au(0) and Pd(0) particles through the aluminosilicate matrix and their extremely small particle size.

Example III

Nitrogen sorption was used to determine BET surface area for the 0.55, 1.10, and 1.82 wt % Pd(0) samples after reduction. Results are shown in Table III. Colloidal particle diameter was calculated with the formula: 2727/BET surface area.

TABLE III

| Sample | BET Surface Area ($m^2/g$) | Colloidal Particle Diameter Based on Surface Area (nm) | Pore Volume (cc/g) |
|---|---|---|---|
| 0.55 wt % Pd(0) | 221 | 12.3 | 0.42 |
| 1.10 wt % Pd(0) | 260 | 10.5 | 0.51 |
| 1.82 wt % Pd(0) | 252 | 10.8 | 0.55 |

The colloidal particle sizes associated with the surface areas are 12.3 nm for the 0.55 wt % Pd(0) sample, 10.5 nm for 1.10 wt % Pd(0) sample, and 10.8 nm for the 1.82 wt % Pd(0) sample. The particle size values for all three samples correlate well with the intended particle size of about 10 nm. All three samples exhibit Type IV isotherms with considerable hysteresis, while the adsorption portion of the isotherms gave pore size distributions from about 2 to about 30 nm.

It should be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The claimed invention is:

1. A method of preparing a metal-rich siliceous material, said method comprising:
   a) mixing one or more salts of one or more metals with a silicic acid solution to form a blend, said metals selected from the group consisting of: palladium, platinum, gold, aluminum, copper, nickel, iron, titanium, cobalt, and combinations thereof;
   b) adding the blend to a basic heel solution at a controlled rate to control colloidal silica particle size from about 1 nanometers to about 250 nanometers, said size depending on the controlled rate, to form colloidal silica particles in a suspension, wherein one or more of the colloidal silica particles includes incorporated metal particles, and wherein the incorporated metal particles are essentially homogenously dispersed within the colloidal silica particles;
   c) optionally concentrating the suspension;
   d) reducing the incorporated metal particles with a reducing agent to form a product; and
   e) optionally further processing the colloidal silica particles or the product.

2. The method of claim 1, including deionizing a sodium silicate solution to prepare the silicic acid solution.

3. The method of claim 1, including combining aluminum chlorohydrate with the silicic acid solution prior to mixing one or more salts of one or more metals with the silicic acid solution to form the blend.

4. The method of claim 1, including one or more salts of one or more metals selected from the group consisting of: palladium acetate; gold chloride; aluminum chlorohydrate; copper chloride; iron trinitrate; nickel nitrate; cobalt chloride; and combinations thereof.

5. The method of claim 1, wherein the basic heel solution includes one or more bases selected from the group consisting of: sodium hydroxide; lithium hydroxide; potassium hydroxide; ammonium hydroxide; primary amines; secondary amines; tertiary amines; quaternary amines; quaternary compounds; and combinations thereof.

6. The method of claim 1, including adding the blend to the basic heel solution at a controlled rate to control colloidal silica particle size from about 4 nanometers to about 150 nanometers.

7. The method of claim 1, including heating the basic heel solution.

8. The method of claim 1, including heating the basic heel solution from about 60° C. to about 90° C.

9. The method of claim 1, wherein the reducing agent is selected from the group consisting of: hydrazine and hydrogen gas.

10. The method of claim 1, wherein further processing the colloidal silica particles or the product includes using one or more processes selected from the group consisting of: ultrafiltration, deionization, heating, drying, concentrating, surface functionalization, and combinations thereof.

11. The method of claim 1, including using the colloidal silica particles or the product in an industrial application selected from the group consisting of: dental applications; protein separation; molecular sieves; nanoporous membranes; wave guides; photonic crystals; refractory applications; clarification of wine and juice; chemical mechanical planarization of semiconductor and disk drive components; catalysts; catalyst supports; retention and drainage aids in papermaking; fillers; surface coatings; ceramic materials; investment casting binders; flattening agents; proppants; cosmetic formulations; and polishing abrasives.

12. A metal-rich siliceous composition comprising a plurality of colloidal silica particles having an average diameter from about 1 to about 250 nanometers and which are produced from a mixture of a silicic acid solution and one or more salts of one or more reduced metals, wherein up to about 10 weight percent metal is associated with the colloidal silica particles, based on total solids, and wherein the associated metal particles are essentially homogenously dispersed within the colloidal silica particles.

13. The metal-rich siliceous composition of claim 12, including a plurality of different reduced metals associated with the colloidal silica particles.

14. The metal-rich siliceous composition of claim 12, wherein the reduced metal is selected from the group consisting of: alkali metals, alkaline earth metals, first row transition metals, second row transition metals, lanthanides, and combinations thereof.

15. The metal-rich siliceous composition of claim 12, wherein the colloidal silica particles include closely-packed and dried colloidal silica particles.

* * * * *